UNITED STATES PATENT OFFICE.

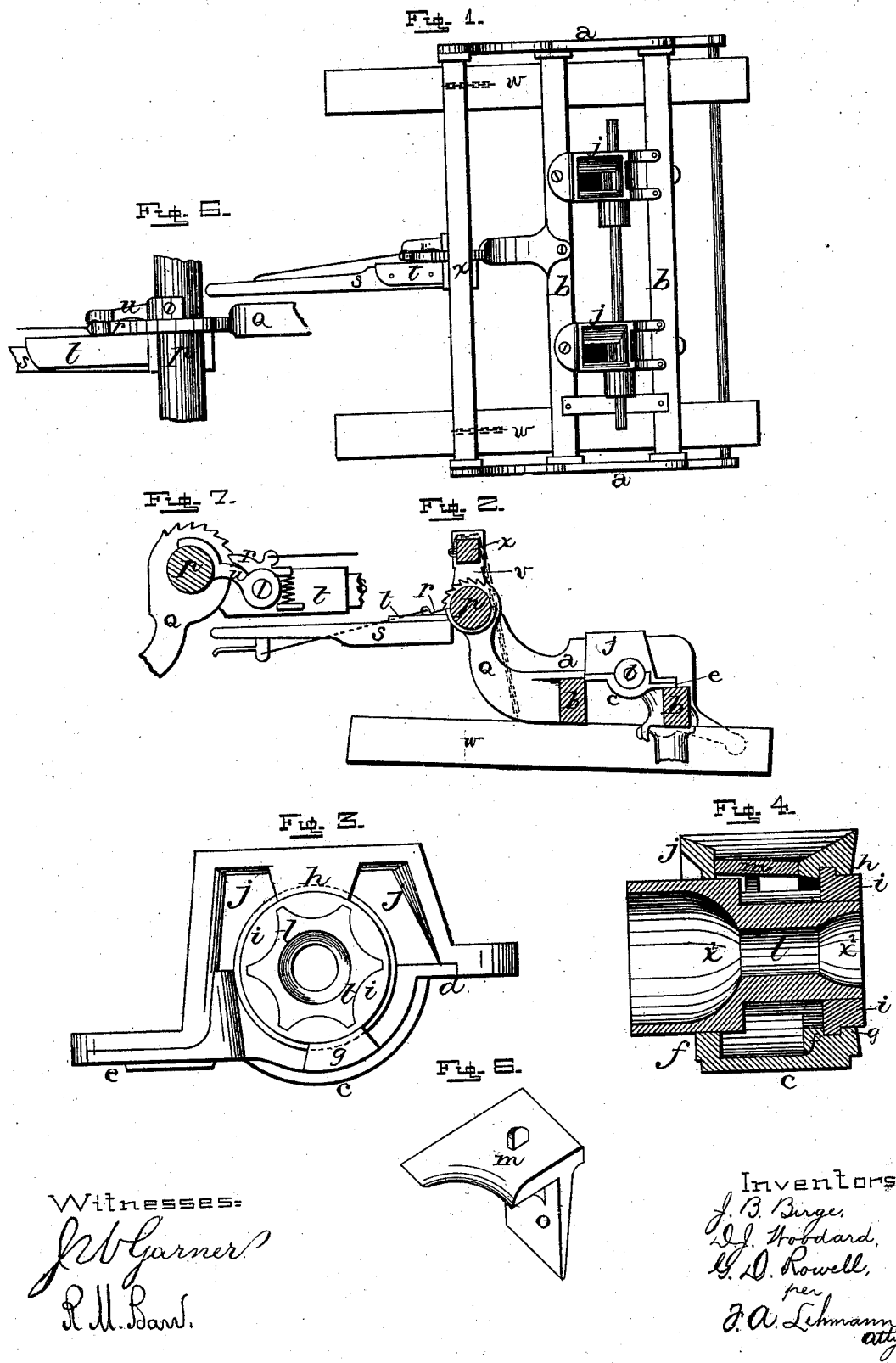

JIRAH B. BIRGE, DANIEL J. WOODARD, AND GUILFORD D. ROWELL, OF APPLETON, WISCONSIN.

IMPROVEMENT IN SEEDING-MACHINES.

Specification forming part of Letters Patent No. 203,529, dated May 14, 1878; application filed March 21, 1878.

*To all whom it may concern:*

Be it known that we, JIRAH BAKER BIRGE, DANIEL JOHNSON WOODARD, and GUILFORD DUDLEY ROWELL, of Appleton, in the county of Outagamie and State of Wisconsin, have invented certain new and useful Improvements in Seeding-Machines; and we do hereby declare the following to be a full, clear, and exact description of the invention, such as will enable others skilled in the art to which it pertains to make and use it, reference being had to the accompanying drawings, which form part of this specification.

Our invention relates to an improvement in seeding-machines; and it consists in the arrangement and combination of parts that will be more fully described hereinafter.

The accompanying drawings represent our invention.

Figure 1 is a plan view of our invention. Fig. 2 is a vertical section, and Figs. 3, 4, 5, 6, and 7 are details, of the same.

$a$ represents the end pieces of the frame, which are made of iron, and have sockets formed upon their inner sides to receive the ends of the two beams $b$. These end pieces and the cross-beams form the frame, upon which the other parts are supported. Extending from the rear beam, which is somewhat higher than the front one, is the casting $c$, which has an ear or projection, $d$, at one end, and two ears or projections, $e$, upon the other, and through these ears are passed the fastening-bolts, by means of which the casting is secured rigidly in position. By making two ears upon the front end there is left a sufficient space between them for the seed to be discharged freely into the scatterer-tubes. Upon the top of this casting are made the two flanges $f$, one upon each edge of the central part, and these flanges are rounded out, so as to form a bearing for the seed-cup to revolve in. Upon one side of this casting is formed a projection, $g$, which has a flange upon its outer end, and catching inside of this flange and inside of a corresponding flange, $h$, upon the upper casting $j$, is the ring $i$, which serves to regulate the amount of seed that shall be sown. This ring, being held loosely in position between the two castings, revolves freely around with the seed-buckets, but cannot be moved laterally. The seed-buckets $l$ are all fastened upon a single shaft, which is revolved by suitable means, and this shaft and the seed-buckets are laterally adjustable back and forth through the two castings $c j$. The buckets or depressions in which the seed fall extend only a little more than half the length of the casting in which they are made; and, as the other portion of this casting is perfectly smooth, it is apparent that when the casting is so adjusted that the buckets alone shall come under the discharge in the seed-box a large quantity of seed will be sown; whereas if the casting is adjusted so that a portion of the plane surface and only a portion of the buckets come under the discharge a smaller quantity of seed will be sown.

If so desired, the casting $x^2$ can be moved forward toward the ring $i$, so as to completely shut out the buckets and present nothing but the smooth surface of the casting to the discharge, and this smooth surface will act as a cut-off to prevent any seed whatever being sown. The upper casting, $j$, corresponds in shape, size, and construction to the lower one, $c$; and as the seed falls into the opening in their tops it is caught by the buckets and forced around, so as to be discharged from the front end between the two projections mentioned above.

As thus constructed, any grain escaping from the seed-box into the two castings will be forcibly carried around and expelled by the buckets, so that there will never be an opportunity for the buckets to become clogged by straw or dirty grain. When it is desired to sow coarse grain, no cover is placed upon the opening through the top of the casting $j$; but when it is desired to sow clover, timothy, or other fine seed, the cover $m$ will be used. This cover has one corner cut away, so as to give just sufficient room to discharge the seed into the buckets, and has the flange $o$ projecting downward along the side of the buckets, as shown, for the purpose of both holding the grain in the buckets until the proper time for it to be discharged, and to serve as a support for the cover to hold it in position.

By means of the construction above described a very simple and effective force discharge for the seed is obtained, and one by which the quantity of seed to be sown can be readily regulated or entirely stopped, if so desired.

Pivoted between the ends of the frame $a$ is the lifting-roll $p$, which is supported and braced in position at its center by means of a curved standard, $q$, which is secured to the rear cross-beam $b$. Upon the outer and upper edge of this standard is made ratchet-teeth, in which the spring-pawl $r$ on the operating-lever $s$ catches, so as to hold the roll in any desired position. The lower end of the lever is securely held in a socket formed in the casting $t$, which is secured to the under side of the roll. Bolted to this casting $i$ is an arm or clamp, $u$, which catches over the top of the roll on the opposite side of the curved standard, and in this manner the lever is secured to the roll, so as to exert a great pressure upon it without in any manner straining the roll or the bolts by means of which the castings are secured to it. To each end of the roll, at suitable distances between, are secured the arms, braces, or supports $v$, to which the lifting-beam $x$ is secured. This beam sweeps around the roll through a little more than a quarter of a circle, and raises or lowers the bars $w$ to any desired extent. By thus having the lifting-bar sweep around the roll in a circle, a large number of bars may be lifted or lowered by exerting but a very slight pressure upon the hand-lever.

A flanged cap has been fitted inside of the seed-case, for the purpose of preventing seed from getting between the cylinder and the case, and this we disclaim.

Having thus described our invention, we claim—

1. The cover $m$, provided with the vertical flange $o$ for holding the cap in position, and having one of its corners cut away, so as to make a small opening for the downward escape of the seed immediately over the top of the cylinder, whereby the machine may be used for sowing fine seed broadcast, substantially as shown.

2. The combination of the curved standard $q$, having the ratchet-teeth formed upon it, with the castings $t$ $u$, one upon each side, operating-lever $s$, and spring-pawl $r$, substantially as specified.

In testimony that we claim the foregoing we have hereunto set our hands this 2d day of March, 1878.

J. B. BIRGE.
D. J. WOODARD.
G. D. ROWELL.

Witnesses:
M. M. SCHOETZ,
ALEX. L. COLLINS.